E. G. COLLINS.
TOBACCO HILLER.
APPLICATION FILED MAR. 14, 1919.
1,329,375.
Patented Feb. 3, 1920.
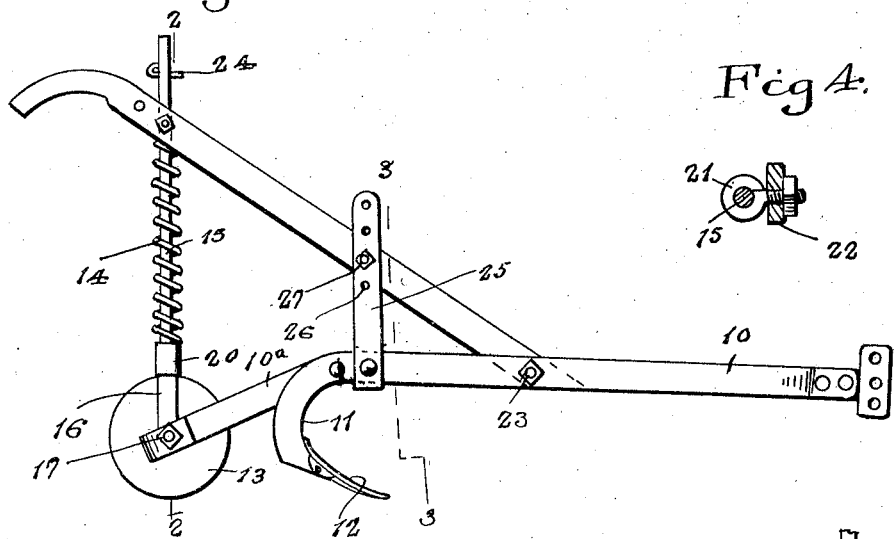
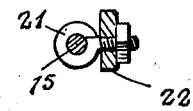
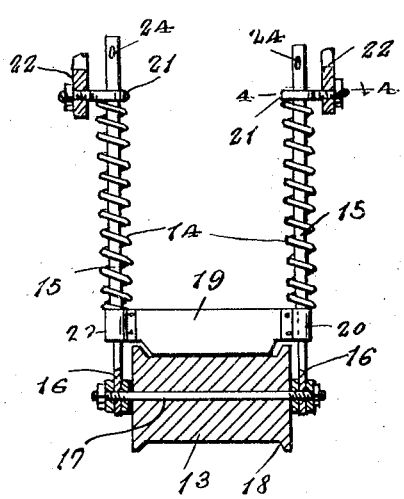
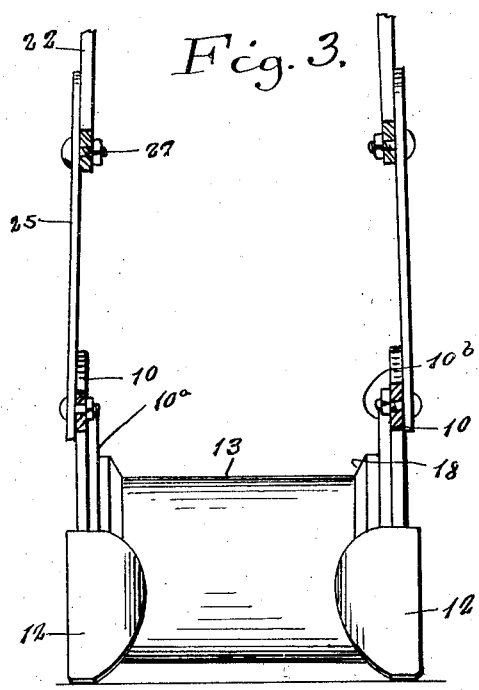
Inventor
E. G. Collins
By
Attorney

UNITED STATES PATENT OFFICE.

EARL G. COLLINS, OF PEMBROKE, KENTUCKY.

TOBACCO-HILLER.

1,329,375.  Specification of Letters Patent.  Patented Feb. 3, 1920.

Application filed March 14, 1919. Serial No. 282,618.

*To all whom it may concern:*

Be it known that I, EARL G. COLLINS, a citizen of the United States, residing at Pembroke, in the county of Christian and State of Kentucky, have invented certain new and useful Improvements in Tobacco-Hillers; and I do hereby declare the following to be a full, clear, and exact description of the invention, such as will enable others skilled in the art to which it appertains to make and use the same.

The object of the invention is to provide a simple, relatively inexpensive and efficient device designed especially for use in hilling tobacco and having means whereby a proper forming and compacting of the soil relative to the row may be effected coincidently with the throwing of the soil inward toward the line of planting, the extent of compacting being readily variable and regulable by the operator in connection with the action of the hilling blades or shovels.

Further objects and advantages will appear in the course of the following description, it being understood that changes in form, proportion and details may be resorted to within the scope of the appended claims without departing from the spirit of the invention.

In the drawing:

Figure 1 is a side view of a machine embodying the invention.

Fig. 2 is a sectional view on the plane indicated by the line 2—2 of Fig. 1.

Fig. 3 is a sectional view on the plane indicated by the line 3—3 of Fig. 1.

Fig. 4 is a horizontal detail sectional view on the plane indicated by the line 4—4 of Fig. 2.

The apparatus consists essentially of a beam 10 which is divided to form the beam members or elements 10<sup>a</sup> and 10<sup>b</sup> which respectively terminate in standards 11 to carry the opposed inwardly acting hilling shovels 12, following which is a compacting roller 13 movably mounted relative to the beam and yieldingly held depressed by means such as the springs 14 coiled around guide rods 15 of which the lower extremities have eyes 16 for receiving the extremities of the roller spindle 17. The compacting roller is preferably provided with terminal beveled flanges 18 for causing an inward pressure upon the soil upon opposite sides of the row of hills or line of planting, and arranged in coöperative relation with the surface of the roller is a scraper 19 provided with terminal sleeves 20 for sliding engagement with the guide rods 15 and having its edge yieldingly held in contact with the surface of the roller by means of the said springs 14.

At their upper ends the guide rods 15 extend through guide eyes 21 against the lower surfaces of which bear the upper extremities of said coiled springs, said guide eyes being supported by the handles 22 which are connected at their forward ends with the beam member as by bolts 23, limiting pins or stops 24 being engaged with the guide rods 15 above the eyes 21, and adjustable braces 25 being arranged to connect the beam elements with intermediate portions of said handles as clearly indicated in Fig. 1. Preferably said braces are provided with a plurality of bolt openings 26 for engagement by bolts 27 extending through registering openings in the said handles.

In operation, the hilling shovels serve to throw the soil inwardly toward the rows so as to form a hill or ridge while the following compacting roller serves to compress or compact the soil inwardly and downwardly relative to the row, the extent of pressure of the roller being dependent upon the springs 14 and the downward pressure exerted upon the handles by the operator, such pressure being transmitted yieldingly through said springs to the roller and incidentally to the scraper so that the surface of the roller is permanently kept free from accumulations of dirt or soil. By means of an apparatus such as described, rows of tobacco may readily and quickly as well as efficiently be hilled to produce the desired relation between the plants and the adjacent soil and obviously with a regularity which is unattainable when the hilling is done by means of a hoe as in the ordinary practice.

Having described the invention, I claim:

1. A tobacco hiller comprising a beam, laterally spaced hilling shovels carried by the beam, links pivotally connected to the beam and extending rearwardly beyond the shovels, a compacting roller mounted between and journaled in the rear ends of the links, handles pivoted to the beam for adjusting with relation to the compacting roller, means adapted to secure the handles in adjusted position, and tension springs mounted between the handles and the roller.

2. A tobacco hiller comprising a beam, laterally spaced hilling shovels carried by the beam, links pivotally connected to the beam and extending rearwardly beyond the shovels, a compacting roller mounted between and journaled in the rear ends of the links, handles pivoted to the beam for adjusting with relation to the compacting roller, means adapted to secure the handles in adjusted position, rods connected to the axis of the roller and having a slidable engagement with the handles, and compression springs mounted upon the rods between the handles and the compacting roller.

In testimony whereof I affix my signature in presence of two witnesses.

EARL G. COLLINS.

Witnesses:
 DOUGLAS GRAHAM,
 ELDON CRUTCHFIELD.